(12) United States Patent  
Coker et al.

(10) Patent No.: US 8,767,341 B1
(45) Date of Patent: Jul. 1, 2014

(54) SERVO SYSTEMS WITH AUGMENTED SERVO BURSTS

(71) Applicant: HGST Netherlands B.V., Amsterdam (NL)

(72) Inventors: Jonathan Darrell Coker, Rochester, MN (US); Timothy John Everett, Niwot, CO (US); David Timothy Flynn, Mantorville, MN (US); James Bowling French, Jr., Longmont, CO (US); Gary Allan Herbst, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/896,209

(22) Filed: May 16, 2013

(51) Int. Cl.
*G11B 5/596* (2006.01)

(52) U.S. Cl.
USPC ........................................ 360/77.08

(58) Field of Classification Search
USPC .................. 360/48, 77.01, 77.08, 75, 40, 49
See application file for complete search history.

(56) References Cited

U.S. PATENT DOCUMENTS

| | | | |
|---|---|---|---|
| 5,847,894 A * | 12/1998 | Blank et al. ............... | 360/77.01 |
| 6,078,445 A | 6/2000 | Serrano et al. | |
| 6,967,808 B1 | 11/2005 | Bandic et al. | |
| 7,110,209 B2 | 9/2006 | Ehrlich et al. | |
| 7,113,362 B1 | 9/2006 | Lee et al. | |
| 7,193,800 B2 | 3/2007 | Coker et al. | |
| 7,349,167 B2 | 3/2008 | Erden et al. | |
| 7,551,379 B2 | 6/2009 | Yu et al. | |
| 7,663,830 B2 | 2/2010 | Jo et al. | |
| 8,000,048 B2 | 8/2011 | Wilson | |
| 2009/0168227 A1 | 7/2009 | Blaum et al. | |
| 2011/0149432 A1 | 6/2011 | Coker et al. | |
| 2011/0149433 A1 | 6/2011 | Coker et al. | |
| 2011/0149434 A1 | 6/2011 | Coker et al. | |
| 2011/0181977 A1 | 7/2011 | Kim et al. | |
| 2012/0087036 A1 | 4/2012 | Hirano et al. | |

* cited by examiner

*Primary Examiner* — Nabil Hindi
(74) *Attorney, Agent, or Firm* — G. Marlin Knight (57) ABSTRACT

Disk drives are described that include a hybrid servo patterns in which the augmented servo burst fields, which can be Integrated Servo sequences, that provide the PES and also supply additional information such as a SAM, LSBs of the track identifier (TID), sector number, depending on the specific embodiment. Embodiments without write-to-read gaps before the servo sector SIDs are described. The augmented servo burst fields can be read after gapless writing of the preceding data area. For seeking operations the needed bits of the TID without having to detect or decode the Integrated Servo sequences or other augmented servo burst fields. Depending on the embodiment all or the most significant bits of the track identifier can be obtained during seeks by reading the TID fields passing under a read head as the read head moves across tracks without having to detect or decode the Integrated Servo sequences.

20 Claims, 5 Drawing Sheets

FIG. 1 (Prior Art)

Hybrid Servo Pattern with Augmented Servo Bursts

FIG. 2A

Hybrid Servo Pattern with Augmented Servo Bursts

FIG. 2B

Hybrid Servo Pattern with Integrated Servo Sequences

FIG. 2C

Hybrid Servo Pattern with Integrated Servo Sequences

SERVO SYSTEMS WITH AUGMENTED SERVO BURSTS

FIELD OF THE INVENTION

This invention relates generally to information storage systems using rotating disks, and more particularly to servo systems and servo patterns on recording disks used to selectively position transducers (heads) over tracks on the rotating disks.

BACKGROUND

Figure 1:
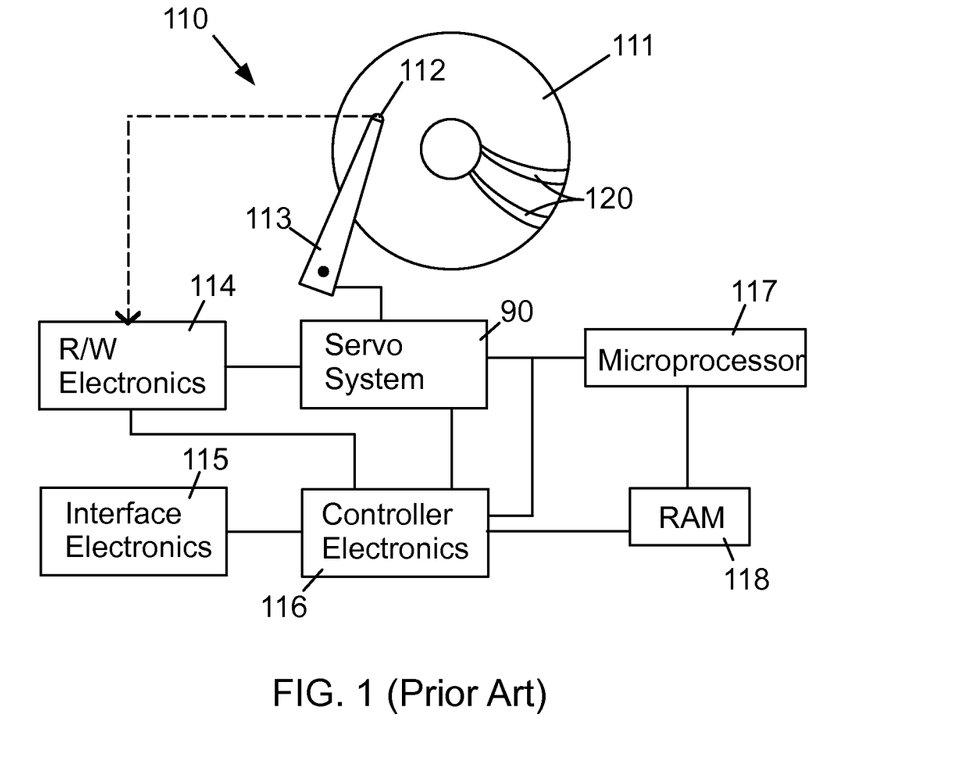
FIG. 1 is a block diagram illustration of selected functional components of a prior art disk drive.

FIG. 1 is a block diagram illustrating selected components of an information storage system (disk drive) 110 according to of the prior art. Disk drives have one or more disks 111 on which ferromagnetic thin materials are deposited. The disk drive includes data recording disk 111, pivoting actuator arm 113, and slider 112 that includes a read head and a write head. The functional blocks include servo system 90, read/write electronics 114, interface electronics 115, controller electronics 116, microprocessor 117, and RAM 118. A disk drive can include multiple disks stacked on a hub that is rotated by a disk motor, with a separate slider for each surface of each disk. The term servo wedge 120 will be used to mean the contiguous set of servo fields extending from ID to OD on the disk.

Disk 111 will typically have multiple servo wedges 120 arranged radially around the disk, but only two are shown for simplicity. Information recorded on the disks is generally organized in concentric tracks or, alternatively, the tracks can be arrange in a plurality of spiral tracks. (For a description of spiral tracks see, for example, U.S. Pat. No. 7,113,362 Lee, et al. Sep. 26, 2006.) In embodiments either of these tracks organizations can be used, and the term "tracks" will be used generically to include these any other similar forms of arrangement.

As part of the manufacturing process permanent servo information is recorded on the disks that provides information to the system about the position of the heads when the disks are rotating during operation. The servo identifier (SID) data on the disk provides several fundamental functions and is conventionally arranged in four distinct fields in each of the plurality of servo sectors angularly spaced around the disk. First, the servo data supplies a timing mark (known as the Servo Track Mark (STM) or equivalently Servo Address Mark (SAM)) which is used to synchronize data within the servo fields, and also provides timing information for write and read operations in the user data portions of the track. Second, the servo area supplies a 10-30 bit digital field, which provides a coarse track-ID (TID) number and additional information to identify the physical servo sector number. The TID is typically written in Gray code as the presence or absence of recorded dibits. During seek operations, when the head is moving across tracks, the head can typically only read a portion of the Gray-code in each TID. The Gray-code is constructed so that pieces of the TID, in effect, can be combined from adjacent tracks to give an approximate track location during a seek.

Finally, the SID field supplies a position error field, which provides the fractional-track Position Error Signal (PES). Auxiliary functions, such as amplitude measurement control or repeatable run-out (RRO) fields are sometimes also used. During read or write operations the drive's servo control system uses the PES servo information recorded on the disk surface as feedback to maintain the head in a generally centered position over the target data track. The typical PES pattern includes a burst pattern in which the bursts are identical sets of high frequency magnetic flux transitions. Unlike the track-ID (TID) field number, the PES bursts do not encode numerical information. In contrast to the TID, it is the position of the bursts that provide information on where the head is relative to the centerline of a track. In a quad-burst PES, the pattern is repeated for each set of four tracks, so only local information is provided. Each servo wedge has four (A,B,C,D) sequential slots reserved for PES bursts, but each track has a centered PES burst in only one of the four slots. Each burst is centered on a selected track, but its width extends to the centerline of adjacent tracks. Thus, when the head is centered over a selected track, it will detect the strongest signal from a burst centered on the selected track, but it will also detect a weaker signal from bursts on the adjacent tracks. For example, when the head is centered over a track with a burst in the A-position, it might also detect a subsequent weak B-burst on the adjacent track on the right and then a weak D-burst from the adjacent track on the left. When the head passes over the PES pattern, the bursts that are within range generate an analog signal (waveform) that indicates the position of the head over the disk and is used as feedback to adjust the position of the head. Variations of the standard quad-burst pattern described above include use of two conventional, single frequency, quad burst servo patterns interspersed with dual frequency, dual burst servo patterns as described by Serrano, et al. in U.S. Pat. No. 6,078,445.

Each of these servo functions typically consumes a relatively independent portion of the servo wedge in prior art servo systems. The overhead on the disk to support these functions is a large factor in the drive's format efficiency. Typically, the servo fields can consume a significant portion of the recording surface of the disk and are an attractive target for reduction.

U.S. Pat. No. 6,967,808 to Bandic, et al. describes a servo pattern having pseudo-random binary sequences for the servo information used to control the position of the recording head. The automatic gain control (AGC), servo timing mark (STM) and PES fields in the prior art are replaced by a pseudo-random binary sequence (PRBS) field. The TID field, which is not included in the PRBS, is encoded twice using non-return to zero (NRZ) encoding, which results in a smaller field and is more efficient than the prior art dibit encoding method used for Gray codes. The PRBS fields are also written using NRZ encoding.

Related prior art includes U.S. Pat. No. 7,193,800 to Coker et al. which describes the use of particular pseudo-noise (PN) or pseudo-random sequence fields for the purpose of PES and rudimentary TID detection. The AGC, STM, TID, and PES fields in the prior art are replaced by a pair of pseudo-random binary sequence (PRBS) fields.

Published US patent application 20090168227 by Blaum, et al. describes a method of distributed track-ID in which first and second portions of a track-ID are physically separated in a disk sector. Each of the portions of the track-ID is encoded using a Gray code.

The Integrated Servo concepts which are referenced herein are described in published U.S. patent applications:
    20110149434 by Coker, et al. (pub. Jun. 23, 2011), Ser. No. 12/653,874, filed Dec. 18, 2009;
    20110149433 by Coker, et al. (pub. Jun. 23, 2011), Ser. No. 12/653,863, filed Dec. 18, 2009
    20110149432 by Coker, et al. (pub. Jun. 23, 2011), Ser. No. 12/653,862, filed Dec. 18, 2009

The Integrated Servo concept implements some or all major servo subfunctions for a storage device in Integrated Servo fields comprising sequences of encoded bits having selected mathematical properties. The Integrated Servo field is composed of a number of encoded sequences, which are members of a selected allowable sequence set that is constrained to provide some or all of the following functions: the Servo Track Mark (STM), the Position Error Signal (PES) and higher level positional information such as the track-ID. Thus, for example, an Integrated Servo embodiment would not need to have separate track ID fields using Gray code to encode the track ID. The integrated servo fields can provide a fractional Position Error Signal (PES) in relation to the center of a data track through the relative amplitude of the signal read for adjacent sequences disposed laterally across the tracks. The servo system detects the sequences in the signal from the read head using a set of digital filters corresponding to the set of encoded sequences. Embodiments of Integrated Servo constraint the placement of sequences so that only mathematically orthogonal sequences are placed next to each other on adjacent tracks. If the servo timing mark (STM) is implemented as part of the Integrated Servo it may or may not be detectable while seeking.

Augmented-servo-burst patterns in which information is encoded in addition to the fractional track PES have been described in the prior art. One example includes Gray code track ID fields plus diagonal burst PES with partial track ID information. See, for example, U.S. Pat. No. 7,110,209 to Ehrlich, et al. (Sep. 19, 2006).

U.S. Pat. No. 8,000,048 to Wilson (Aug. 16, 2011) describes use of phase-type servo patterns for track identification. The servo pattern include multiple circumferentially-spaced chevron patterns of discrete patterned servo islands. The chevron patterns are arranged to indicate the absolute radial position of the head without the need for separate track identification fields.

Figure 3A:
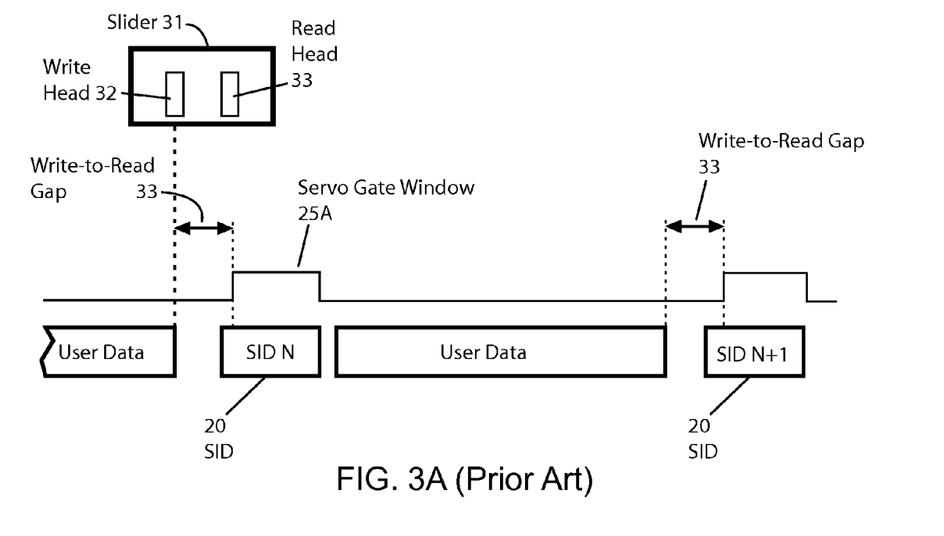
FIG. 3A is an illustration of two selected SID fields with write-to-read gaps arranged on a track according to the prior art.
Figure 3B:
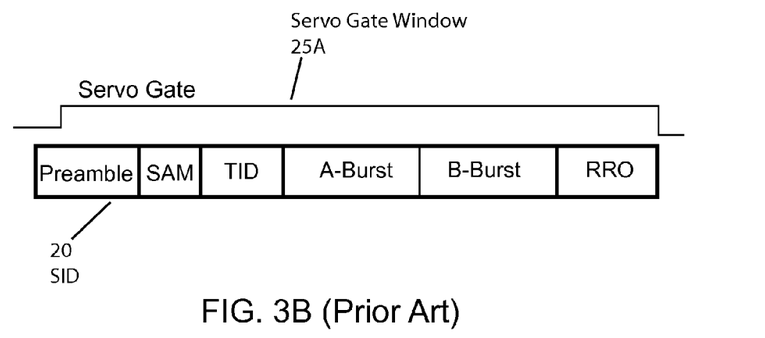
FIG. 3B is an illustration of components of the SIDs according to the prior art.

FIG. 3B illustrates the fields in a selected servo ID (SID) 20 according to the prior art. The preamble precedes Servo Address Mark (SAM) which is a timing mark which is used to synchronize data within the servo fields, and also provides timing information for write and read operations in the data portions of the disk. Second, the SID supplies a multi-bit digital field, which provides a coarse track-ID (TID) number and additional information to identify the physical SID number. The TID is typically written in Gray code as the presence or absence of recorded dibits. During seek operations, when the head is moving across tracks, the head can typically only read a portion of the Gray code in each TID. The Gray code is constructed so that pieces of the TID, in effect, can be combined from adjacent tracks to give an approximate track location during a seek.

The SID also supplies a position error field (A & B bursts in this example), which provides the fractional-track Position Error Signal (PES). Auxiliary functions, such as amplitude measurement or repeatable run-out (RRO) fields are sometimes also used. During read or write operations the drive's servo control system uses the PES servo information recorded on the disk surface as feedback to maintain the head in a generally centered position over the target data track. The typical PES patterns include either two or four bursts that are identical sets of high frequency magnetic flux transitions. FIG. 3B shows an example using only two PES bursts. The PES bursts are arranged in a pattern which generates a signal in the read head that is a function of the position of the read in relation to the centerline of the track. For example, the A and B bursts can be radially offset from each other by a half a track width and are sequential in the circumferential direction. Unlike the track-ID (TID) field number, the conventional PES bursts do not encode numerical information. The PES burst pattern is repeated for each set of two or four tracks, so only local information is provided.

The write-to-read gap 33 is included to allow for the physical separation between the write head 32 and the read head 33 in slider 31 and to provide the time/distance needed to switch from writing data to reading the next servo sector ID (SID) 20. (See FIG. 3A). The servo gate assertion period (window) 25A begins in the preamble and ends in this example with the RRO field. The bulk of the write-to-read gap is caused by the physical separation between the writer and reader. In most head designs the reader leads the writer as shown, so when the writer reaches the end of the data sector, the reader is already some distance beyond the end of the data sector which creates a physical gap. In addition some gap is needed to allow for the time needed for the drive's control systems to switch from writing to reading, but this switching gap is much smaller than the physical writer to reader separation. Accordingly servo systems have typically included a write to read gap 33 in the track format between the end of a writable data sector and the start of the following servo sector information.

A complicating factor in minimizing the needed gap is that the geometrical relationship (skew) between the heads and the track varies with the position of the mechanical actuator that move the slider with the heads in an arc across the disk surface. U.S. Pat. No. 7,551,379 to Yu, et al. (Jun. 23, 2009) describes a system in which the write element leads the read element in the tangential direction of rotation of the magnetic disk. The servo sector information is arranged such that information that is not needed for write operation is placed at the end of the servo sector. In this way, the servo read operation can be terminated sooner and the write operation can initiate sooner after going over the servo sector.

SUMMARY OF THE INVENTION

A first set of embodiments of servo systems includes a hybrid servo pattern with augmented servo bursts without write-to-read gaps before the servo sector SIDs. A dedicated SAM field is included, but in addition, a SAM function is provided by the augmented servo bursts in addition to the PES information. The complete track identifier (TID) can be provided in Gray code format in a dedicated TID field or the TID can be divided into two components with the most significant bits (MSBs) of the track number being in Gray code format in a dedicated TID field and the least significant bits (LSBs) of the TID being encoded in the augmented servo burst patterns. The augmented servo bursts can also encode the sector number and optionally RRO information. In alternative embodiments the entire TID can be encoded Gray code format in the dedicated TID field with the augmented servo burst encoding the sector number and optionally RRO information.

Eliminating the write-to-read gaps adds additional user-data capacity. During seeking and reading operations full SIDs can be read for every servo wedge. The acceptable tradeoff for being able to write data much closer to the gapless SIDs is that the servo system does not detect the separate dedicated SAM or read the TID field in the gapless SIDs during write operations. Preferably the servo gate control signal is delayed to skip over the SAM and the TID field and is then enabled to read the augmented servo bursts that include a SAM and the PES bursts. The PES bursts in the gapless SIDs are used during read and write operations, so track-following is enabled. Track-following requires only the PES bursts since the fine position information is fully contained within the bursts.

A second family of embodiments of servo systems includes Integrated Servo sequences that provide the PES, a SAM and additional encoded information. Embodiments in this second family can include write-to-read gaps or omit some or all of the write-to-read gaps. The TID field can include all of the track identification bits or just a predetermined number of MSBs of the track identification in Gray code format. The LSBs of the track identification, if any, can be encoded in Integrated Servo sequences. In alternative embodiments the Integrated Servo sequences can provide a sector number, RRO information, and sync/AGC functions. In embodiments that omit some or all of the write-to-read gaps, write operations with no write-to-read gaps can still read the Integrated Servo sequences and use the information provided, which can include SAM, PES and TID LSB. Otherwise, during read operations the entire servo pattern is used. Seeking operations can obtain the needed bits of the TID without having to detect or decode the Integrated Servo sequences. Depending on the embodiment all or the most significant bits of the track identifier can be obtained during seeks by reading the TID fields passing under a read head as the read head moves across tracks without having to detect or decode the Integrated Servo sequences. Because the Integrated Servo sequences in these embodiments do not have to provide information during seeks, the design choices are expanded and the robustness of the servo system is improved.

DETAILED DESCRIPTION OF THE INVENTION

Figure 2A:
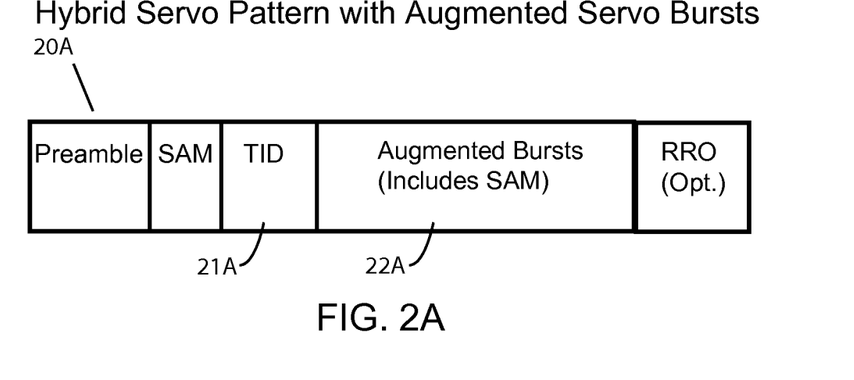
FIG. 2A is an illustration of the fields in a first hybrid servo pattern embodiment with augmented servo bursts used in selected embodiments.

FIG. 2A is an illustration of the fields in a first hybrid servo pattern 20A embodiment with augmented servo bursts 22A used in selected embodiments. In this embodiment the complete track ID information is included in TID 21A. The preamble, SAM and TID 21A are conventional. An RRO field (not shown) is optional. The augmented servo burst (ASB) 22A patterns as defined herein are patterns that include additional information beyond the PES. In this embodiment the ASB 22A includes a SAM function that can be used during write operations that do not include a write-to-read gap for the preceding sector. Optionally the ASB can include local identification such as a sector number.

Figure 2B:
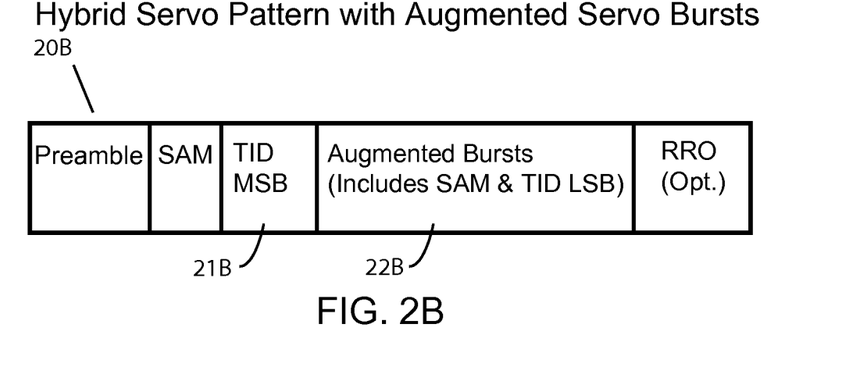
FIG. 2B is an illustration of the fields in a second hybrid servo pattern embodiment with augmented servo bursts used in selected embodiments.

In the second embodiment of a hybrid servo pattern 20B illustrated in FIG. 2B, the track ID information is divided between the TID-MSB field 21B which encodes the MSB bits of the track ID in Gray code and the augmented servo bursts (ASBs) 22B which encode the LSB bits of the track ID, provides a SAM and also provides the PES. Augmented servo burst (ASB) 22B patterns provide the LSB. The number of bits allocated to the TID Gray code versus the augmented servo bursts 22B can vary according to the specific application. The sector number can also be encoded in the augmented servo bursts using standard encoding schemes.

Figure 2C:
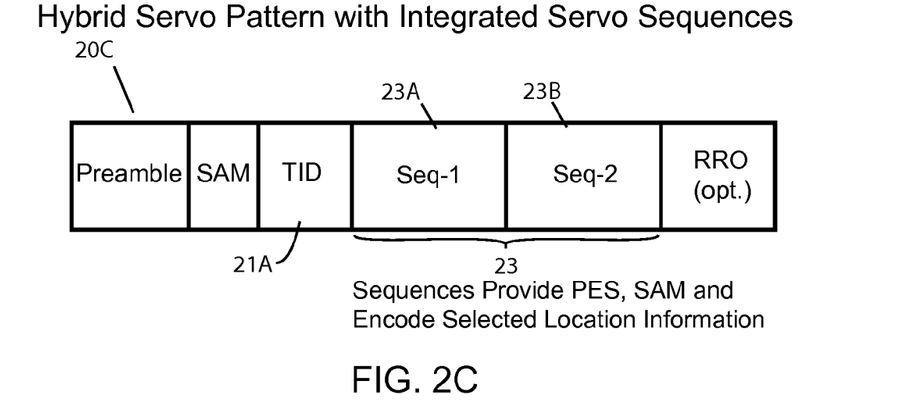
FIG. 2C is an illustration of the fields in a first hybrid servo pattern embodiment with Integrated Servo sequences used in selected embodiments.

FIG. 2C is an illustration of the fields in a hybrid servo pattern 20C with the pair of Integrated Servo sequences 23 used in selected embodiments. In this embodiment the complete track ID information is in TID field 21A which encodes the entire track ID in Gray code. The Integrated Servo sequences 23A, 23B (Seq-1, Seq-2), provide a PES, a SAM and can encode selected information such as the sector identifier. The manner in which Integrated Servo sequences encode information and provide a PES and SAM are described in published U.S. patent applications identified above. The optional separate RRO field is shown.

Figure 2D:
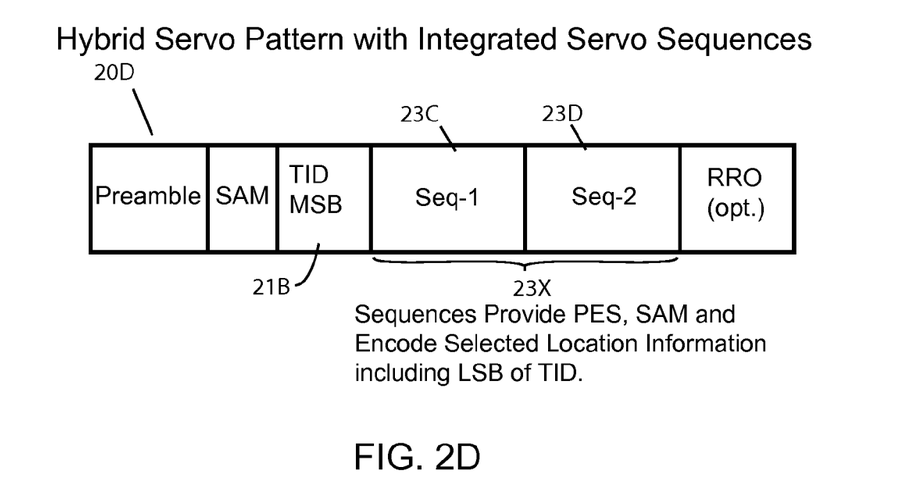
FIG. 2D is an illustration of the fields in a second hybrid servo pattern embodiment with Integrated Servo sequences used in selected embodiments.

FIG. 2D is an illustration of the fields in a hybrid servo pattern 20D with the pair of Integrated Servo sequences 23X used in selected embodiments in which most significant bits of the track ID information are in TID-MSB field 21B which encodes the information in Gray code. The Integrated Servo sequences 23C, 23D, provide a PES, a SAM and encode the least significant bits of the TID. The Integrated Servo sequences can also encode selected information such as the sector identifier.

In general, the Integrated Servo sequences can be designed to supply multiple functions including TID, SAM, RRO and PES as described in the cited published patent applications. The fractional PES is supplied by the relative amplitude of the read head signal generated from two or more sequences disposed laterally across the tracks. Additional information is encoded in the selection and arrangement of the specific sequences from track to track and sector to sector. Extraction of the encoded information requires decoding or reading each sequence in the servo pattern and then converting this sequence combination into numerical values which give the predetermined information, for example, for the LSBs of the track identifier, etc. The number of bits allocated to the Gray code versus the Integrated Servo sequences can vary according to the specific application. The sector number can be encoded using the Integrated Servo sequences according to standard encoding schemes.

The method of writing the Gray code used in both of these the hybrid servo embodiments can be different from the wide bi-phase code pattern used for the traditional TID Gray code.

There are many sources of variation in the readback signal in disk drive. For example, the tracks deviate from perfect circles. There is variation in the length of the data blocks and the individual bits. Thus readback sample timing/clocking needs to be dynamically adjusted, ideally on a sector by sector basis. One purpose for the signals from the SIDs is to provide a sync signal for the disk lock clock that is needed to correctly read the user data bits in the following data block.

Some clock synchronization is typically required to read the Gray code in TID. In the traditional servo system the Gray code detector is synchronous, using the preamble field preceding the Gray code to get a digital phase-locked loop (DPLL) locked onto the pattern. The detection process for the Gray code used in embodiments can be asynchronous. For example, the sync mark (SAM) function can be supplied by the first sequence field Seq-1 which follows the Gray code. Because the sync mark follows the TID field, the TID field is sampled and buffered in a FIFO until it can be synchronously processed after the sync mark has been found in the first sequence field. Thus, interpretation of the raw samples of data from the TID field is performed by looking backwards from the synchronizing point supplied in the first sequence field. The Integrated Servo sequence sets and the corresponding set of filters can be used to provide the SAM function.

Figure 4A:
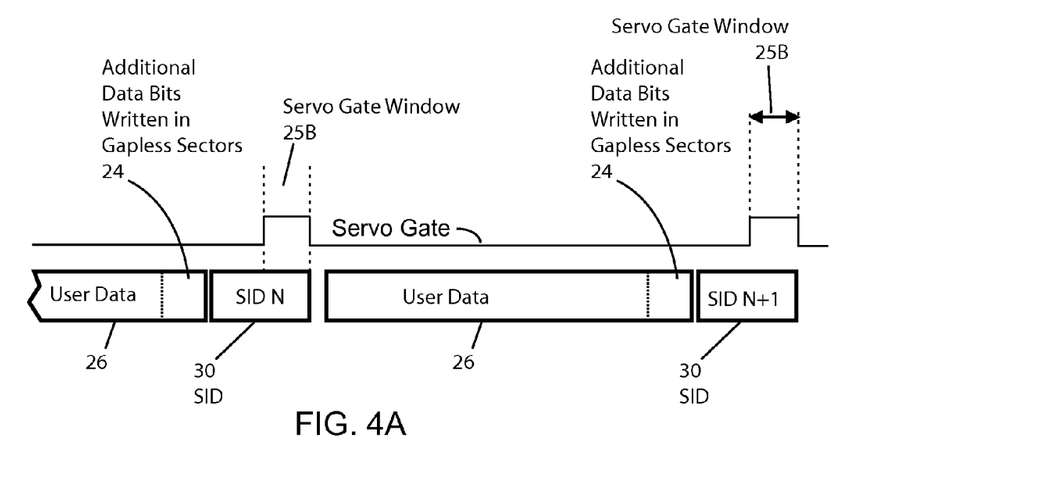
FIG. 4A is an illustration of two selected SID fields without write-to-read gaps arranged on a track according to an embodiment.
Figure 4B:
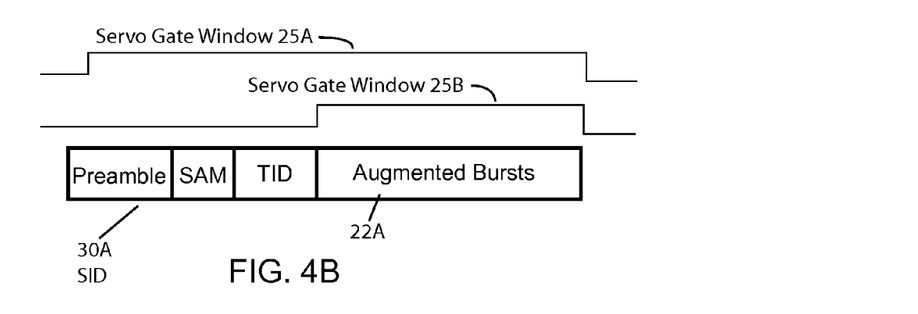
FIG. 4B is an illustration of components of the SIDs in FIG. 4A according to an embodiment using augmented servo bursts.
Figure 4C:
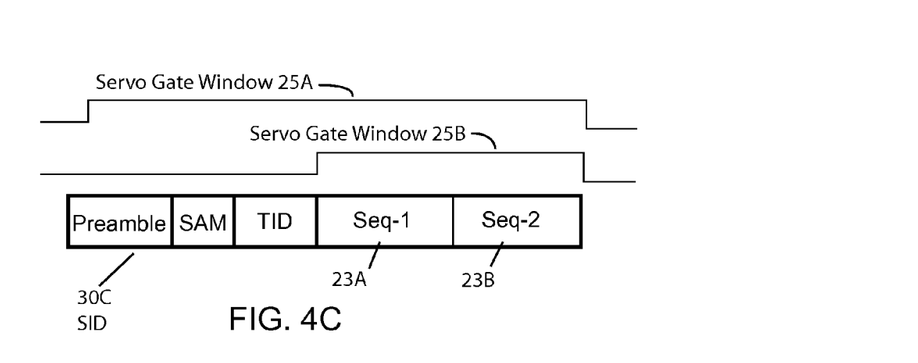
FIG. 4C is an illustration of components of the SIDs in FIG. 4A according to an embodiment using Integrated Servo sequences.

FIG. 4A is an illustration of an embodiment without write-to-read gaps. It should be noted there is an inevitable tolerance gap (to avoid overwriting the SID when writing data) between the end of the user data and the start of the SID, but this tolerance gap is much smaller than the write-to-read gap. Although this example shows adjacent sectors as having no write-to-read gap, embodiments can also omit the gaps from only selected sectors. For example, gaps can be included in an odd-even pattern so that every other sector has a gap. As described above some selected number of LSB bits of track ID can be included along with the conventional fractional-track PES signal, which can be either ASBs or Integrated Servo sequences as illustrated in FIGS. 4B & 4C or the SIDs illustrated in FIGS. 2A-D. The encoding and design of the ASB patterns and Integrated Servo sequences are according to the prior art unless otherwise noted herein. The most significant bits (MSBs) of the track number are in the TID field in Gray code format. The TID Gray code is read during seeks and read operations. After a write operation (without a gap) the Gray code in the TID in the following SID is not read, because the read head is already beyond the start of the TID when writing ends. During writes the servo controller can still use the ASBs or the Integrated Servo sequences for track following because the fractional PES signal is generated by these fields.

FIG. 4A is an illustration of two consecutive SID fields 30 without write-to-read gaps arranged on a track according to an embodiment. Although only two are shown, a track will have a large number of SIDs. The user data 26 is extended by the area 24 which is where the write-to-read gaps would otherwise occur. The servo gate window 25B in this example applies only to the case where the user data has been written immediately before the SID 30. FIG. 4B is an illustration of an embodiment of the SID 30A according to an embodiment using augmented servo bursts 22A. FIG. 4C is an illustration of an embodiment of the SID 30C using Integrated Servo sequences 23A, 23B. The standard servo gate window 25A applies except in the case when the user data has been written (without a gap) immediately before the SID and in this case the servo gate window 25B is used. Servo gate window 25B is timed to begin at the augmented servo bursts 22A or Integrated Servo sequences 23A, 23B.

The requirements of the servo system during seeking are substantially different than during track following. Because the read heads are moving across tracks some information in the SIDs may not be reliably readable. Integrated Servo sequences are more difficult to read during seeks and can appear to be smeared. Accordingly reliance on detecting the SAM from an Integrated Servo sequence during seeking can be problematic. Therefore, embodiments of the invention allow the separate SAM field to be used during seeks.

However, there are also advantages to including a SAM function in the ASBs or Integrated Servo sequences fields in addition to the standard separate SAM field. This allows the SAM signal to be detected even when using servo gate window 25B as described above when writing gapless data sectors. Although a particular servo system might be able to tolerate a failure to detect a single SAM, for example, having the redundancy of being able to detect SAM in the Integrated Servo sequences fields increases the robustness of the design. In addition, when a SAM function is included in the Integrated Servo sequence fields, it needs only be found while in the track-following mode, and there is no need to find it while seeking. This alternative increases the number of usable patterns of sequences from which to choose. It is increased because many patterns that meet the requirements while in the track-following mode, fail to meet them when those patterns are subjected to the distortions caused by seeking. With a greater choice of patterns, it may be possible to identify otherwise unusable sequence patterns which minimize the susceptibility to servo head instabilities because a conventional servo pattern's servo timing mark can be used while seeking.

Integrated Servo uses orthogonal sequences on adjacent track which is not as flexible as Gray code for the track MSBs of the track number; so embodiments use a combination of Gray code with Integrated Servo sequences. The format efficiency improvements offered by Integrated Servo are still largely realized.

The invention claimed is:

1. A method of operating a disk drive having tracks on a disk including a plurality of angularly spaced servo ID (SID) fields that include a TID field and at least two Integrated Servo sequences, the method comprising:
    performing reading operations by determining a predetermined number of most significant bits of the track identifier by reading the TID field in a selected SID and determining a predetermined number of least significant bits of the track identifier by decoding information encoded in the Integrated Servo sequences in the selected SID; and
    performing seeking operations using most significant bits of the track identifier obtained by reading the TID fields passing under a read head as the read head moves across tracks.

2. The method of claim 1 further comprising:
    writing a first set of data bits without a write-to-read gap separating the first set of data bits from a first SID on the track by processing the first SID by ignoring the TID field, then reading the Integrated Servo sequences in the first servo ID field.

3. The method of claim 2 wherein writing a first set of data bits without a write-to-read gap further comprises detecting a SAM using the Integrated Servo sequences in the first servo ID field.

4. The method of claim 2 wherein ignoring the TID field further comprises keeping a servo gate control signal inactive until after the TID field in the first servo ID field has passed under a read head.

5. The method of claim 1 wherein performing reading operations by determining a predetermined number of most significant bits of the track identifier by reading the TID field in the selected SID further comprises asynchronously sampling the TID field, detecting a first Integrated Servo sequence then synchronously processing samples of the TID field using the first Integrated Servo sequence as a sync mark.

6. The method of claim 1 wherein performing reading operations by determining a predetermined number of most significant bits of the track identifier by reading the TID field in the selected SID further comprises asynchronously sampling the TID field, detecting a first Integrated Servo sequence using a digital filter that detects one of the Integrated Servo sequences in the set of sequences then synchronously processing samples of the TID field using the digital filter detection of the first Integrated Servo sequence as a sync mark.

7. The method of claim 1 wherein the TID field is encoded using a Gray code.

8. The method of claim 1 wherein the SIDs include a repeatable run-out (RRO) field.

9. The method of claim 1 wherein the Integrated Servo sequences in an SID include first and second sequences of encoded bits that are selected from an allowable set of sequences and first and second sequences taken together encode the predetermined number of least significant bits of the track identifier.

10. The method of claim 9 wherein the Integrated Servo sequences are arranged so that sequences that are laterally adjacent are mathematically orthogonal.

11. A disk drive comprising:
a rotatable disk with a plurality of tracks with at least first track including a plurality of angularly spaced SIDs with each SID including a TID field and at least two Integrated Servo sequences selected from an allowable set of sequences, and sectors of data bits recorded between consecutive SIDs; and
a servo system that reads the following TID field in a selected SID after reading a sector of data bits preceding the selected SID to obtain a predetermined number of most significant bits of the track identifier and obtains a predetermined number of least significant bits of the track identifier by decoding information encoded in the Integrated Servo sequences in the selected SID, and that performs seeking operations using most significant bits of the track identifiers obtained by reading the TID fields passing under a read head as the read head moves across tracks.

12. The disk drive of claim 11 further comprising:
means for writing a first sector of data bits without a write-to-read gap separating the first set of data bits from a first SID on the track by processing the first SID by ignoring the TID field, then reading the Integrated Servo sequences in the first servo ID field.

13. The disk drive of claim 12 wherein ignoring the TID field further comprises keeping a servo gate control signal inactive until after the TID field in the first servo ID field has passed under a read head.

14. The disk drive of claim 11 wherein the servo system reads the following TID field in a selected SID by asynchronously sampling the TID field, detecting a first Integrated Servo sequence then synchronously processing samples of the TID field using the first Integrated Servo sequence as a sync mark.

15. The disk drive of claim 11 further comprising a set of digital filters containing a filter for detecting each of the sequences in the allowable set of sequences.

16. The disk drive of claim 15 wherein the digital filter detection of an Integrated Servo sequence in an SID provides a sync mark.

17. The disk drive of claim 11 wherein the TID field is encoded using a Gray code.

18. The disk drive of claim 11 wherein the Integrated Servo sequences in an SID include first and second sequences of encoded bits that are selected from an allowable set of sequences and first and second sequences taken together encode the predetermined number of least significant bits of the track identifier.

19. The disk drive of claim 18 wherein the Integrated Servo sequences are arranged so that sequences that are laterally adjacent are mathematically orthogonal.

20. A method of operating a disk drive having tracks on a disk including a plurality of angularly spaced servo ID (SID) fields that include a TID field and at least two Integrated Servo sequences, the method comprising:
performing reading operations by determining a predetermined number of bits of the track identifier by reading the TID field in a selected SID and determining a sector number by decoding information encoded in the Integrated Servo sequences in the selected SID;
performing seeking operations using most significant bits of the track identifier obtained by reading the TID fields passing under a read head as the read head moves across tracks; and
writing a first set of data bits without a write-to-read gap separating the first set of data bits from a first SID on the track by processing the first SID by ignoring the TID field, then reading the Integrated Servo sequences in the first servo ID field.

* * * * *